United States Patent [19]
Pariot et al.

[11] Patent Number: 5,589,811
[45] Date of Patent: Dec. 31, 1996

[54] POWER DOOR SAFETY SENSING STRIP

[75] Inventors: Robert Pariot, New Windsor, N.Y.; J. Mortimer Traugott, Riverton, N.J.

[73] Assignee: Techstrip, Inc., Oaklyn, N.J.

[21] Appl. No.: 493,624

[22] Filed: Jun. 22, 1995

[51] Int. Cl.$^6$ .................................................... H01C 3/00
[52] U.S. Cl. ................. 338/210; 200/61.43; 200/61.62; 200/61.71; 338/317; 338/208
[58] Field of Search ............................. 338/67, 207, 208, 338/212, 215, 317, 330, 113, 114, 210, 211, 61.71; 248/300, 316.7; 200/61.43, 61.62, 61.72, 61.73; 49/26, 27

[56] References Cited

U.S. PATENT DOCUMENTS

| | | | |
|---|---|---|---|
| 2,452,116 | 10/1948 | Felton | 248/300 |
| 2,843,690 | 7/1958 | Miller | 200/61.43 |
| 3,056,005 | 9/1962 | Larson | 338/208 |
| 3,118,984 | 4/1961 | Koenig | 200/61.43 |
| 3,163,842 | 1/1962 | Wittwer | 338/317 |
| 3,277,256 | 3/1965 | Jones | 200/61.43 |
| 3,315,050 | 4/1967 | Miller | 200/61.43 |
| 4,071,218 | 1/1978 | Pecka et al. | 248/316.7 |
| 4,684,768 | 8/1987 | Sackmann et al. | 200/61.62 |
| 5,023,418 | 6/1991 | Beckhausen | 200/61.43 |
| 5,085,389 | 2/1992 | Levesque | 248/300 |
| 5,087,799 | 2/1992 | Pariot et al. | 200/61.43 |
| 5,148,911 | 9/1992 | Miller et al. | 200/61.43 |
| 5,157,230 | 10/1992 | Blubaugh | 200/61.43 |
| 5,259,143 | 11/1993 | Mitchell et al. | 49/27 |
| 5,481,076 | 1/1996 | Mullet et al. | 200/61.43 |

*Primary Examiner*—Teresa J. Walberg
*Assistant Examiner*—Karl Easthom
*Attorney, Agent, or Firm*—Brumbaugh, Graves, Donohue & Raymond

[57] ABSTRACT

A power door safety sensing strip with a bracket strip for attachment to the face of a power operated garage door. The sensing strip includes a flexible insulating tubular member having a bell-like shaped cross section with a wide inner face. A flat insulating member fastened to a narrow section of the bell-like member extends to the wide inner face. Conductive surfaces on the wide inner face and on the flexible insulating member are moved into contact upon deformation of the bell-like member, thereby providing electrical contact. A Z-shaped bracket to attach the sensing strip to the face of a power operated door has one leg adapted to be attached to the door face. Another leg of the bracket, formed with a U-shaped receptacle, receives and holds the sensing strip so that it extends a short distance beyond the door edge.

8 Claims, 2 Drawing Sheets

POWER DOOR SAFETY SENSING STRIP

BACKGROUND OF THE INVENTION

Sensing strips are widely used on the edges of power doors to provide safe power door operation. A person or object in the door closure path causes the strip to deform and an electrical contact to close, resulting in immediate deenergization or reversal of the drive motor. Thus injury to the person or object obstructing closure of the door is prevented.

One type of sensing strip, disclosed in U.S. Pat. No. 3,315,050 to Miller, utilizes a pair of foam pads carrying conductive aluminum sheets. Intermediate the foam pads is another foam strip formed with openings. Upon deformation of the outer foam pad, the aluminum sheets are forced into contact through one of the openings to close a suitable circuit.

To overcome the operating problems occurring with the Miller type strip when the strip jacket is ruptured by vibration or puncture, permitting moisture and contaminates to enter, an improved power door sensing strip impervious to moisture and contaminants and reliably operative when engaged by an object, is disclosed in U.S. Pat. No. 5,087,799 by the applicants of this invention. In that sensing strip, a pair of electrical conductors are positioned in a sealed plastic tube that is supported in a molded foam block so that external forces result in contact between conductors. To ensure reliable operation, there are no internal supports placed between the conductors. Moreover, short circuits caused by moisture and contaminants entering the foam, in the event an outer jacket seal is broken, are eliminated.

While the invention of U.S. Pat. No. 5,087,799 provides a sensing strip with many advantages, the cost of such a sensing strip inhibited sales to residential customers. In particular, photoelectric cells mounted about six inches above a door sill can be sold at low cost, thereby providing a cost advantage over the sealed safety sensing strip. However, it is desirable to have a sensing strip closed by deformation since the door can then be powered to one inch above the sill, rather than six inches, before being driven closed by the motor operator. Hence it would be advantageous to have a safety sensing strip competitive economically with photo cells, for use on residential power operated garage doors.

BRIEF SUMMARY OF THE INVENTION

The present invention provides an improved power door safety sensing strip readily attached to power operated doors, and particularly residential power operated garage doors, through use of a novel bracket holding the strip. The safety strip operates reliably when engaged by an object.

More specifically, the inventive safety sensing strip includes a flexible insulating tubular member having a bell-like shaped cross section with a wide inner face. A flat insulating elongated member fastened to a narrow section of the tubular member extends to the wide inner face. Conductive surfaces on the wide inner face and on the flexible insulating member are moved into contact upon deformation of the tubular member, thereby providing electrical contact and a signal to stop or reverse an operating motor.

To mount the improved safety sensing strip on a door, a novel Z-shaped bracket strip is provided. One leg of the bracket strip is adapted to be attached to the inside face of the door. Thus the strip need not function as a sealing strip. Another leg is formed with a U-shaped receptacle to receive the safety sensing strip and hold it in position extending a short distance beyond the door edge.

The resulting simple and readily manufactured sensing strip, easily attached by the novel bracket to the inner face of a power door, provides reliable sensing of objects encountered by the door, thereby insuring safe operation of the door.

These and other features and advantages of the invention will be more readily understood when the following description is read in connection with the accompanying drawings.

DESCRIPTION OF EXEMPLARY EMBODIMENTS

Figure 1:
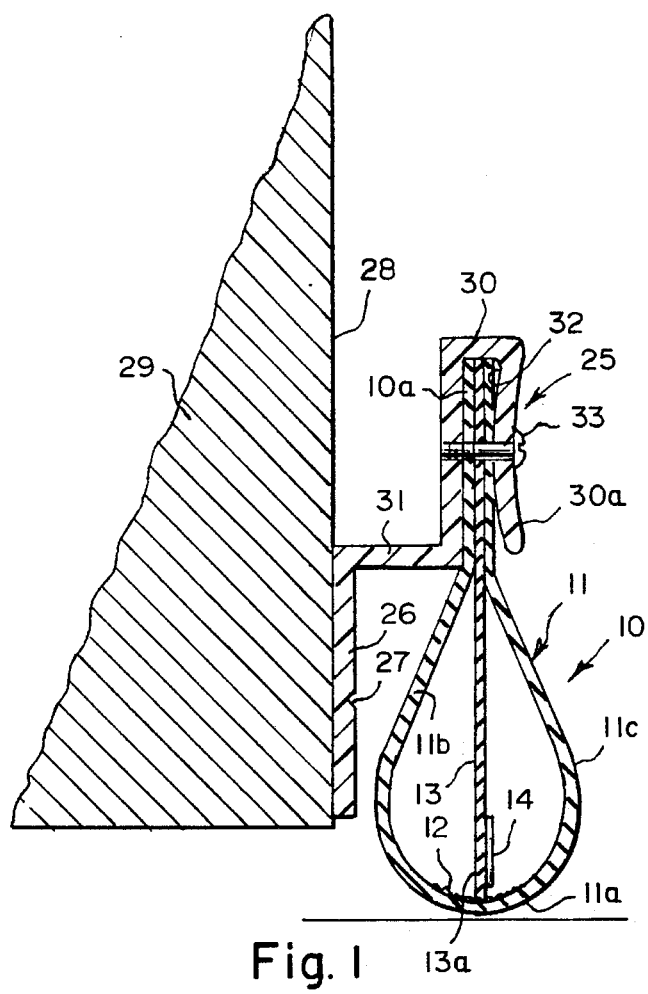
FIG. 1 is a vertical cross section of the inventive safety sensing strip installed in it's attachment bracket and affixed to the inside face of a power operated door.
Figure 2:
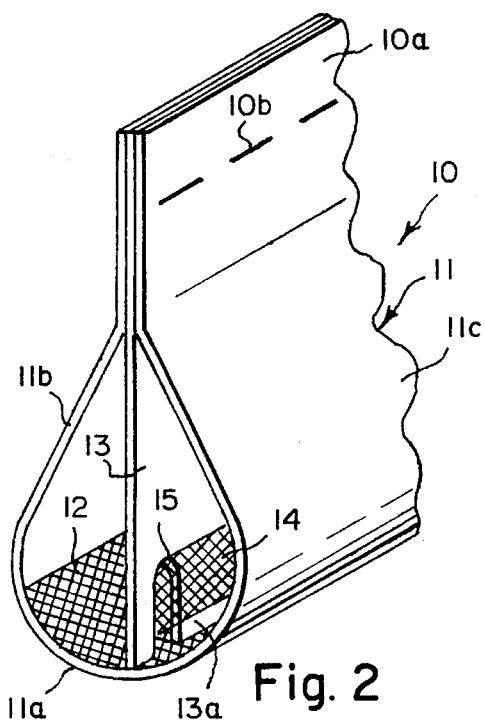
FIG. 2 is a perspective view of one end of the safety sensing strip of the invention with an end cap removed.
Figure 3:
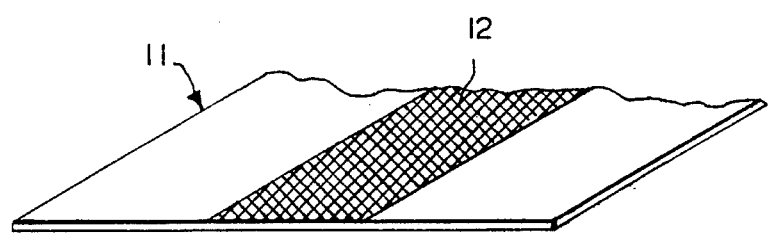
FIG. 3 shows the tubular bell-like portion of the strip, prior to assembly, with a conductive surface in place.

Referring to the drawings in greater detail, with reference to FIGS. 1–4, a power door safety sensing strip 10 is formed by a flexible insulating elongated tubular member 11 having a bell-like shaped cross section with a wide inner face on which is located a flexible conductive surface 12. More particularly, the tubular member 11 is formed with an arcuate deformable portion 11a connected to flexible sidewalls 11b and 11c which form, with a portion of a flat insulating member 13, a narrow section 10a of the strip 10. The wide inner face on the arcuate portion 11a faces the narrow section 10a. The insulating tubular member may be formed of 1/32" Neoprene, a synthetic rubber trademarked by DuPont, or other similar flexible insulating material. The flexible conductive surface 12 can be formed of knitted wire mesh glued or sewn in place. It has been found that a tube of wire mesh flattened, as shown, provides excellent electrical contact material. Other suitable conductive surfaces, such as deposited silver or foil also may be used.

The flat flexible insulating member 13, similar to a clapper, extends from the narrow section 10a of the strip 10 into contact with and substantially perpendicular to the conductive surface 12 of the tubular member 11. One end of the flexible clapper 13 and the ends of the tubular member are fastened together by gluing or sewing, or both, as shown at 10b, to form the section 10a.

Figure 4:
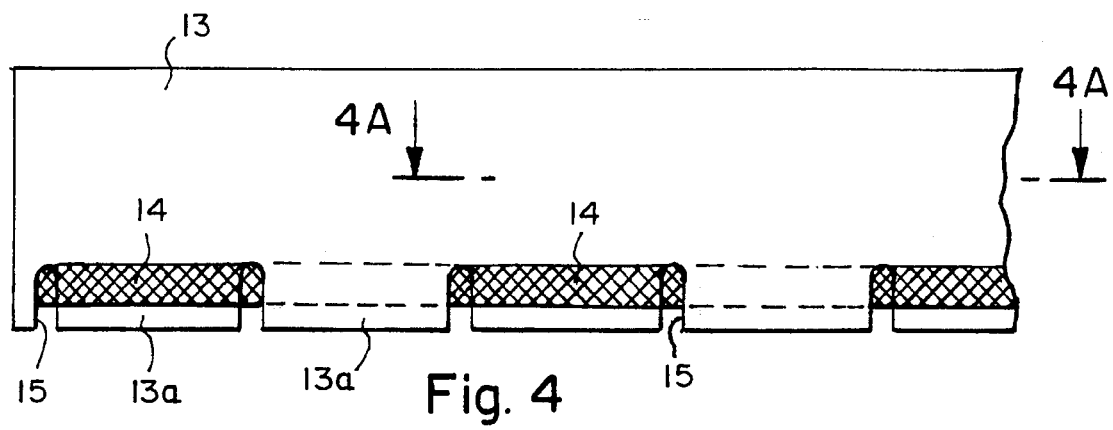
FIG. 4 shows a flat insulating member used with the safety strip shown in FIGS. 1 and 2 and having flexible conductive surfaces on its opposite sides.

As best shown in FIG. 4, conductive surfaces 14 are provided on both sides of the clapper 13. The conductive surfaces 14 can be formed of knitted wire mesh wormed through slots 15. A slot width of 1/8" has functioned satisfactorily. Tubular wire mesh flattened to provide the configuration shown has been found to be an excellent electrical contacting material. Other conductive surfaces may be used, for example, foil glued or otherwise affixed to both sides of the clapper, and may run continuously along the member 13.

Figure 4A:
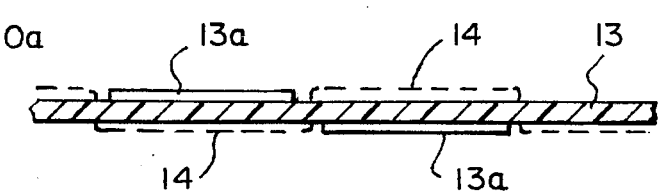
FIG. 4A is a cross-section along the view lines 4A—4A of FIG. 4 looking in the direction of the arrows showing slight bulges in miniature clappers in the device.

The slots 15 form miniature flat portions or clappers 13a which tend to bulge slightly to both sides of the clapper 13 when it is placed in contact with the surface 12. Each of the miniature clappers 13a normally bulges away from the wire mesh 14 associated with it shown in the drawing FIG. 4A in the interests of clarity, the bulge being slight and just sufficient to function as described) and acts to provide an insulating surface between the conductive surfaces 12 and 14. This prevents the clapper conductive surfaces 14 from moving into contact with the surface 12 until an obstruction is sensed. In this manner, false signals due to unwanted contact between those surfaces are minimized.

Figure 5:
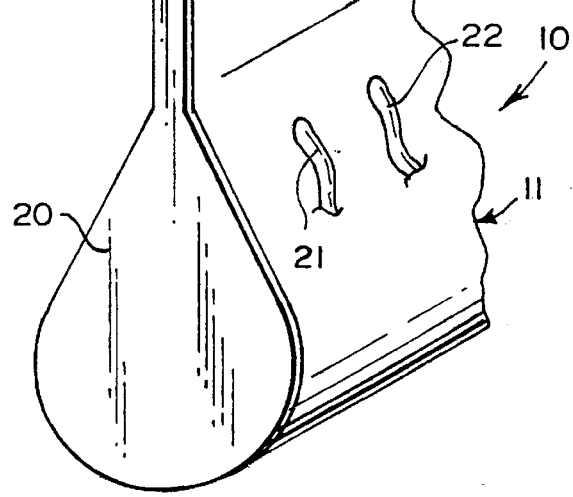
FIG. 5 is a perspective view of one end of the safety sensing strip showing an end cap and conductors extending from the strip.

As shown in FIG. 5, a flexible end cap 20 is affixed to and encloses the ends of the safety sensing strip 10 by an appropriate means, for example, gluing or welding. The cap 20 prevents the entrance into the strip 10 of insects, dirt, contaminates, etc.

Conductors 21 and 22, leading from conductive surfaces 12 and 14, respectively, provide electrical sensing information to appropriate circuits for a power door operator.

Figure 6:
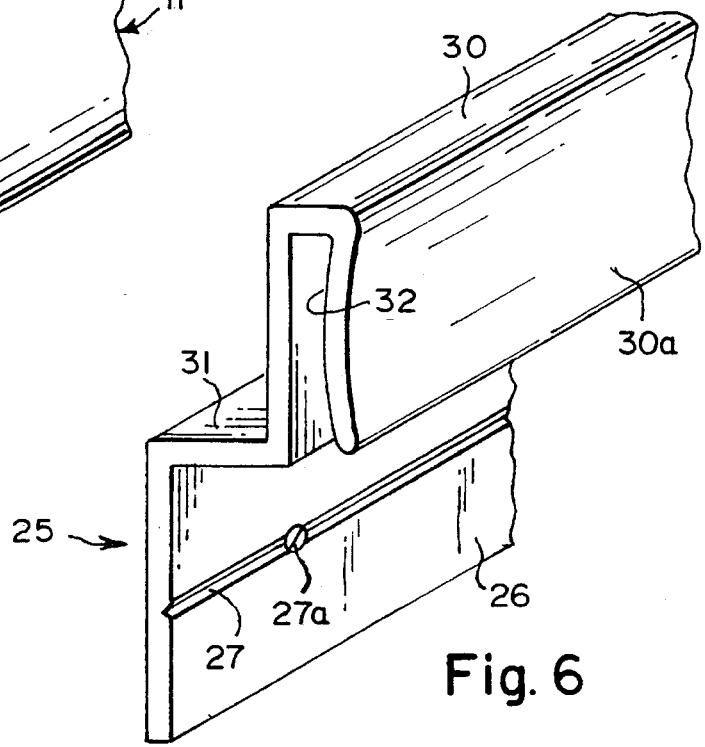
FIG. 6 is a perspective view of the inventive Z-shaped bracket strip adapted to hold the sensing strip and attach it to the face of a power operated door.

In order to attach the inventive safety sensing strip to the inside face of a power operated door, as shown in FIG. 1, a Z-shaped attachment bracket 25 (FIG. 6) includes a leg 26 with a V shaped notch 27 for receiving screws 27a (FIG. 6) to affix the bracket 25 to the inside face 28 of a power operated door 29.

Another leg 30 of the bracket 25, connected to the leg 26 by web 31, is formed to provide a U-shaped receptacle 32 to receive the narrow end of the sensing strip 10, as shown in FIG. 1. The bracket 25, molded of a suitable plastic, is formed so that a flange 30a of the leg 30 is positioned to provide a restricted opening for the receptacle 32 and is curved at it's lower portion so that the strip 10 can be forced upwardly into the receptacle 32, and frictionally held. Suitable screws 33, spaced along the Z-shaped strip 25, are then inserted to hold the strip 10 in place. For ease of installation, the strips 25 may be made in three foot lengths. The strips 10 can be of lengths suitable for garage doors, for example nine feet. If other lengths are desired, they can be used with Z-shaped strips 25 that have been cut to a suitable length.

A significant advantage of the present safety sensing strip is that unlike a number of prior art strips, it is not designed as a seal for the door. Rather, it can advantageously be used on residential garage doors, for example previously installed doors, which are being converted to power operation. Such doors have soft foam or comparable seals extending from the edge toward the front of the doors. Thus, the inventive safety strip can readily be installed on the inside face of power operated doors and not interfere with the sealing of the door by the original strips.

In operation, deformation of the strip 10 from the bottom or either side, by an object in the path of door closure, causes rotation of the conductive surface 14 toward a parallel relationship with the surface 12 to cause contact of the conductive surfaces 12 and 14, thereby providing a signal on the conductors 21 and 22 for transmission to suitable motor operating circuits for stopping or reversing the door.

It is been found that with a strip 10 formed of a tubular member 11 of 1/32 Neoprene and a clapper 13 of 1/32" Neoprene, the tubular section being three quarter inches wide at its widest point and the strip being about one and one half inches high, measured by the length of the clapper 13, a 1/4" deformation of the strip 10 from any direction will cause the conducting surfaces 12 and 14 to engage electrically. Note also that it is been found preferable to have such an exemplary strip 10 extend about 3/8" below the inside face of the door, as shown in FIG. 1.

Another advantage of the invention is that with the strip 10 on the inside face of the door, as shown in FIG. 1, there is no need to be concerned with the manner in which the door closes and seats. This has been a concern with safety strips which are designed to seal the door.

From the foregoing description, it is apparent that the inventive safety sensing strip can be manufactured economically and yet reliably functions to sense objects in the closure path of a power door. In addition, the novel mounting arrangement on the inside face of the door permits advantageous installation on existing garage and other doors. Note that electrical connections may be provided at both ends of the strips 10 to render the strip non-handed.

The invention has been described with reference to a specific embodiment. It will be understood, however, that various changes and modifications may be made within the scope of the invention which is defined in the appended claims.

We claim:

1. A door safety sensing strip for attachment to a power door for sensing an object obstructing closure of the door comprising a flexible insulating elongated tubular member having a bell-like shaped cross section, the tubular member being formed by an arcuate deformable portion connected by flexible sidewalls to a narrow section, a wide inner face on the arcuate portion facing the narrow section, a first flexible conductive surface on the wide inner face, a flat flexible insulating member fastened to and extending from the narrow section of the tubular member into contact with and substantially perpendicular to the conductive inner surface, second flexible conductive surfaces on opposite sides of the flat insulating member located near the first conductive inner surface of the tubular member, whereby deformation of the tubular member will result in electrical contact between the first conductive inner surface of the tubular member and at least one of the second conductive surfaces on the flat insulating member due to bending of the flat insulating member causing said at least one second conductive surface to rotate toward a parallel relationship with and engage the first conductive surface to form an electrical contact.

2. A sensing strip as defined in claim 1, wherein the first and second conductive surfaces are wire mesh.

3. A sensing strip as defined in claim 2, in which slots are formed in the flat member and the wire mesh is wormed through the slots, and miniature flat portions formed by the slots bulge slightly to both sides of the flat member.

4. A sensing strip as defined in claim 1, in which caps are affixed to the ends of the strips and conductors attached to the first and second conductive surfaces are electrically connected to conductors on the outside of the strip.

5. Door safety sensing strip apparatus for providing a power operated door with a sensing strip comprising a sensing strip formed of a flexible insulating elongated tubular member having a bell-like shaped cross section, the tubular member being formed by an arcuate deformable portion connected by flexible sidewalls to a narrow section, a wide inner face on the arcuate portion facing the narrow section, a first flexible conductive surface on the wide inner face, a flat flexible insulating member fastened to and extending from the narrow section of the tubular member into contact with and substantially perpendicular to the conductive inner surface, second flexible conductive surfaces on opposite sides of the flat insulating member located near the first conductive inner surface of the tubular member, a generally Z-shaped bracket strip for holding the sensing strip, one leg of the bracket strip being formed to be affixed to the face of the door, the other leg of the bracket strip consisting of a U-shaped receptacle to receive and hold the sensing strip, whereby when the bracket strip is affixed to the face of the door at the door edge, the sensing strip will extend a short distance beyond the door edge to sense any object obstructing closure of the door by deformation of the tubular member resulting in bending of the flat insulating member to cause one second conductive surface to rotate toward a parallel relationship with and engage the first conductive surface to form an electrical contact.

6. Apparatus as defined in claim 5, wherein the first and second conductive surfaces are wire mesh.

7. Apparatus as defined in claim 5, in which slots are formed in the flat member and the wire mesh is wormed through the slots, and miniature flat portions formed by the slots bulge slightly to both sides of the flat member.

8. Apparatus as defined in claim 5, wherein the U-shaped receptacle incudes a flange positioned to narrow the opening to the receptacle so that the sensing strip will be frictionally secured in the receptacle.

* * * * *